(12) United States Patent
Compton et al.

(10) Patent No.: US 10,971,786 B2
(45) Date of Patent: Apr. 6, 2021

(54) ISOLATIVE SHIELD WITH POSITIONAL CONTROL FEATURES FOR WELDED FLEXIBLE CELL TABS IN AN HV BATTERY CELL STACK

(71) Applicant: GM Global Technology Operations LLC, Detroit, MI (US)

(72) Inventors: Nicholas Compton, Freeland, MI (US); Igor M. Kan, Waterford, MI (US); Sami A. Syed, Windsor (CA); Jason Mazza, Royal Oak, MI (US); Steven D. Lorentz, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 287 days.

(21) Appl. No.: 15/952,913

(22) Filed: Apr. 13, 2018

(65) Prior Publication Data
US 2019/0319250 A1   Oct. 17, 2019

(51) Int. Cl.
*H01M 2/26* (2006.01)
*B23K 26/70* (2014.01)
*H01M 50/531* (2021.01)
*B23K 26/21* (2014.01)
*B23K 101/36* (2006.01)

(52) U.S. Cl.
CPC ......... *H01M 50/531* (2021.01); *B23K 26/706* (2015.10); *B23K 26/21* (2015.10); *B23K 2101/36* (2018.08)

(58) Field of Classification Search
CPC .... B23K 101/36; B23K 26/21; B23K 26/706; H01M 2/06; H01M 2/1077; H01M 2/14; H01M 2/18; H01M 2/202; H01M 2/26
See application file for complete search history.

(56) References Cited

U.S. PATENT DOCUMENTS

| | | | | |
|---|---|---|---|---|
| 5,434,017 A | * | 7/1995 | Berkowitz | H01M 2/0404 429/130 |
| 8,609,276 B2 | * | 12/2013 | Han | H01M 10/425 429/158 |
| 2008/0124617 A1 | | 5/2008 | Bjork | |
| 2011/0229754 A1 | | 9/2011 | Zhao et al. | |
| 2013/0104390 A1 | | 5/2013 | Zhao et al. | |
| 2015/0207127 A1 | | 7/2015 | Davis et al. | |
| 2015/0214583 A1 | * | 7/2015 | Lim | H01M 2/1016 429/90 |
| 2016/0141708 A1 | | 5/2016 | Le Gal | |
| 2016/0181579 A1 | * | 6/2016 | Geshi | H01M 2/105 429/61 |

* cited by examiner

*Primary Examiner* — Anca Eoff
(74) *Attorney, Agent, or Firm* — Quinn IP Law

(57) ABSTRACT

A cell stack includes adjacent first and second battery cells respectively having a positive cell tab, a negative cell tab, and an outer surface. The outer surfaces are flush. The positive cell tab of the first battery cell protrudes from the outer surface of the first battery cell, and the negative cell tab of the second battery cell protrudes from the outer surface of the second battery cell. An isolative shield is positioned adjacent to the outer surfaces, and defines through-slots receiving therein a respective one of the cell tabs. A method includes providing the cell stack, inserting the cell tabs into the pair of through-slots of the isolative shield, positioning a primary surface of the isolative shield adjacent to the outer surfaces of the adjacent battery cells after inserting the cell tabs, and affixing the primary surface of the isolative shield to the cell stack.

12 Claims, 6 Drawing Sheets

US 10,971,786 B2

ISOLATIVE SHIELD WITH POSITIONAL CONTROL FEATURES FOR WELDED FLEXIBLE CELL TABS IN AN HV BATTERY CELL STACK

INTRODUCTION

Electrochemical battery packs are used in a wide variety of electrical systems. A battery pack may be constructed of multiple interconnected cell stacks, with each cell stack including several battery cells. Within each cell stack, individual battery cells may be placed adjacent to a cooling plate and separated from adjacent battery cells by a foam layer. An internal stack-up within each respective battery cell may include a thin layer of insulating material, e.g., polyethylene and/or polypropylene film, which is disposed between oppositely-charged electrode foils. The stack-up may be enclosed within a sealed outer pouch containing an electrolyte material.

Individual electrode foils of a battery cell, generally referred to as anode and cathode foils, may be coated with an application-suitable active material such as lithium oxide or graphite. Cell tabs are electrically connected to the respective charge-specific electrode foils within the pouch. The cell tabs protrude a short distance from an outer perimeter edge of the pouch. The protruding cell tabs are then welded together to construct the cell stack, with multiple cell stacks electrically interconnected via a conductive bus bar to construct a battery pack having an application-suitable voltage capacity.

Cell stack-ups having the above-noted construction may have a cell tab configuration that is either symmetrical or asymmetrical. In a symmetrical tab configuration, the cathode and anode tabs of a given battery cell protrude from diametrically-opposite perimeter edges of the pouch, e.g., the anode tab of a battery cell may protrude from the top of the stack and the cathode tab may protrude from the bottom of the stack, with alternating polarity of cell tabs of adjacent battery cells. In contrast, the cell tabs of an asymmetrical battery cell protrude from the same perimeter edge, such that the anode and cathode tabs are arranged side-by-side. While both tab configurations have certain performance or packaging benefits, due to its unique arrangement the symmetrical tab configuration may be used to form battery stacks having a relatively high power density.

SUMMARY

A battery section is disclosed herein having at least one cell stack. The cell stack includes a plurality of battery cells constructed with a symmetrical tab configuration as described above. That is, the cell tabs of a given one of the battery cells protrude from opposite outer surfaces of the battery cell. Series or parallel welds may be formed in the cell stack, e.g., using a laser welding process. However, laser welding and other welding processes may generate molten droplets referred to as weld spatter. Due to their miniscule size, the weld spatter droplets may penetrate into the cell stack or the surrounding structure. An isolative shield configured as set forth herein is therefore included as part of the cell stack to help address this potential manufacturing challenge.

Additionally, the isolative shield facilitates manufacturing of the cell stack by aiding in the positioning and retention of exposed cell tabs. Cell tabs are typically constructed of relatively thin, easily deflected foil sheets. The relative positions of the cell tabs may vary as a result of the thin foil construction. Electrical isolation challenges may also be present due to the close proximity of adjacent cell tabs, particularly during handling of the cell stack prior to and during the welding process. The isolative shield of the present disclosure therefore forms a thin but solid physical barrier to errant droplets of weld spatter and, at the same time, enables consistent tab positioning and retention as described below.

According to an exemplary embodiment, the cell stack includes adjacent first and second battery cells each respectively having a positive cell tab, a negative cell tab, and an outer surface. The outer surface of the first battery cell is flush with the outer surface of the second battery cell. The positive cell tab of the first battery cell protrudes from the outer surface of the first battery cell, and the negative cell tab of the second battery cell protrudes from the outer surface of the second battery cell. The isolative shield in this embodiment is positioned adjacent to the outer surfaces of the adjacent first and second battery cells, with a body of the shield arranged perpendicular to the cell tabs. The isolative shield defines a pair of through-slots each receiving therein a respective one of the positive and negative cell tabs. The isolative shield is configured to align and structurally support the positive and negative cell tabs prior to a welding process, and form a physical barrier to ingress of weld spatter into the first and second battery cells during the welding process.

The cell stack may include a conductive interconnect member that is conductively welded to the positive and negative cell tabs of the adjacent first and second battery cells.

An interconnect board (ICB) may be positioned between the isolative shield and the outer surfaces of the adjacent first and second battery cells. In such an embodiment, a primary surface of the ICB may be contoured to mesh with a primary surface of the isolative shield.

The isolative shield may define first and second transverse ribs each having an elongated apex respectively defining the first and second through-slots. An interference fit may be provided between the first and second through-slots and the respective positive and negative cell tabs along the elongated apex.

The isolative shield in some embodiments is thermoformed, or constructed of compression molded or injection molded plastic, and may have a thickness of less than about 1 mm. The isolative shield may also include a pair of flat end flanges having an undersurface that rests on the outer surfaces of the adjacent first and second battery cells.

A method is also disclosed herein for constructing a cell stack. The method according to an exemplary embodiment includes providing the above-noted cell stack, and then inserting the positive and negative cell tabs into a pair of through-slots of an isolative shield. The method also includes positioning a primary surface of the isolative shield adjacent to the outer surfaces of the adjacent first and second battery cells after inserting the positive and negative cell tabs, as well as affixing the primary surface of the isolative shield to the cell stack. In an actual application, the number of through-slots and cell tabs will vary, and therefore "a pair" as used herein describes, for illustrative purposes, the smallest possible embodiment of a multi-cell cell stack, as will be appreciated by those of ordinary skill in the art.

An isolative shield is also disclosed for use with a cell stack having adjacent battery cells with respective outer surfaces, with the outer surfaces being flush with each other, and with a plurality of cell tabs of the battery cells protruding in a column from the outer surfaces. The isolative shield includes a rectangular corrugated body having a length, and also includes a pair of flat end flanges disposed at distal ends of the rectangular corrugated body. The end flanges are configured for attachment to the cell stack. The shield includes a plurality of transverse ribs extending orthogonally with respect to the length of the rectangular corrugated body, each of the transverse ribs defining a respective through-slot along an elongated apex. The through-slots have a width that is less than a width of the cell tabs by an amount sufficient to form an interference fit with the cell tabs.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
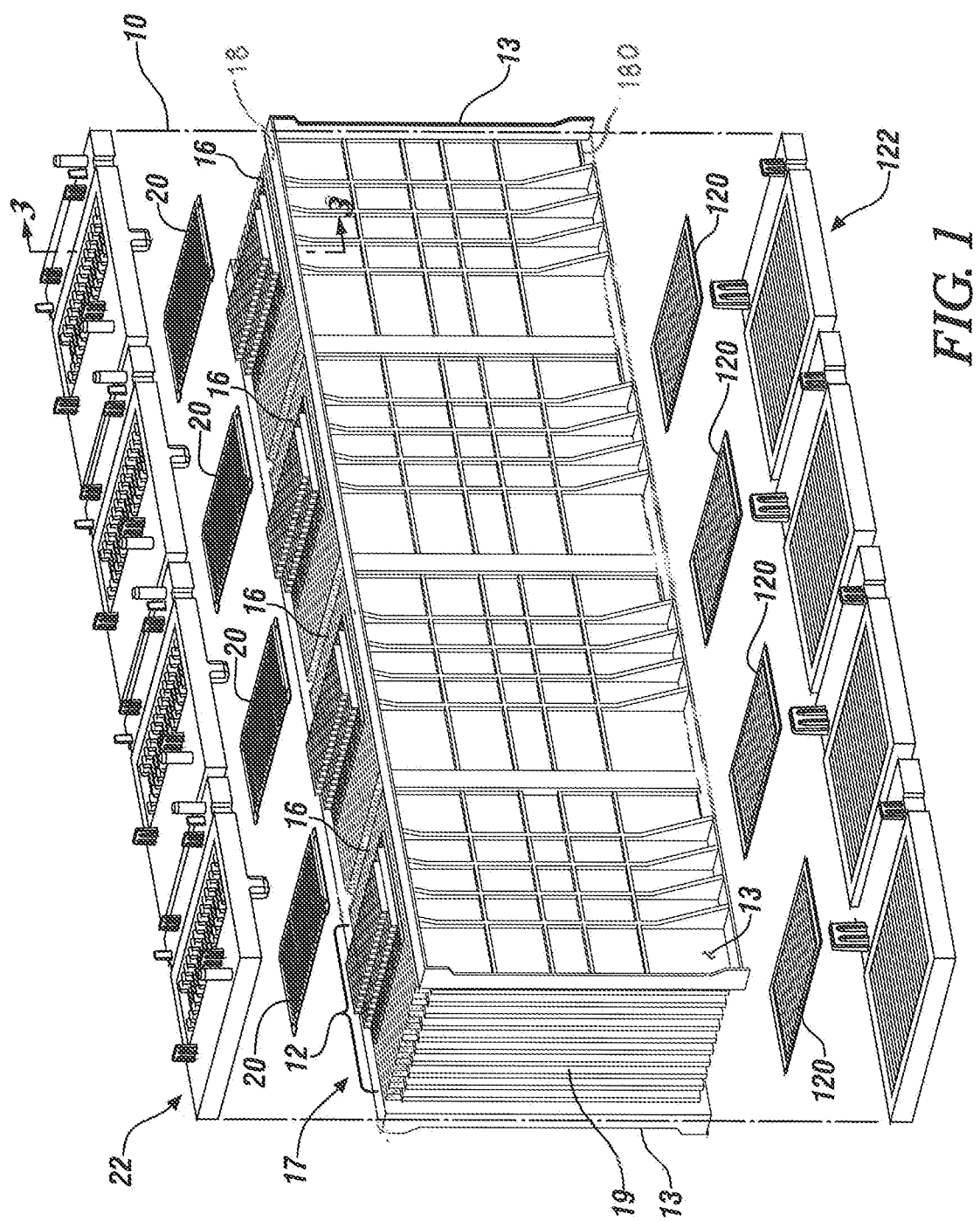
FIG. 1 is a schematic perspective exploded view illustration of an example battery section having multiple cell stacks each configured with an isolative shield as set forth herein.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Referring to the drawings, wherein like reference numerals are used to identify like or identical components in the various views, FIG. 1 schematically illustrates an exploded view of an example battery section 10, which may be used alone or as part of a larger battery pack (not shown). The battery section 10 is constructed of a plurality of electrically interconnected cell stacks 12 each using a respective isolative shield 20 as described herein. The individual cell stacks 12 of the battery section 10 are positioned adjacent to protective side plates 13, e.g., plastic or other lightweight and structurally rigid plates together forming a protective and structurally supportive outer barrier alongside of the cell stacks 12. While four identically-configured cell stacks 12 are shown in FIG. 1, the actual number of cell stacks 12 used in a given application may vary, and therefore the battery section 10 depicted in FIG. 1 is non-limiting and exemplary of the present teachings.

Each cell stack 12 includes a plurality of battery cells 16, i.e., two or more battery cells 16. The battery cells 16 of a given cell stack 12, which are separated from battery cells 16 of an adjacent cell stack 12 by spacers 19, may be embodied as polymer-coated foil pouch-type battery cells of the type described above. As such, each battery cell 16 includes internal positive and negative electrode foils (not shown) that terminate in a charge-specific cell tab 17, with the individual cell tabs 17 of the battery cells 16 used in a given cell stack 12 aligned in a column as shown. The cell tabs 17 protrude orthogonally from diametrically-opposed, mutually flush outer surfaces 18 and 180 of the battery cells 16, and thus of the corresponding cell stacks 12.

Figure 4:
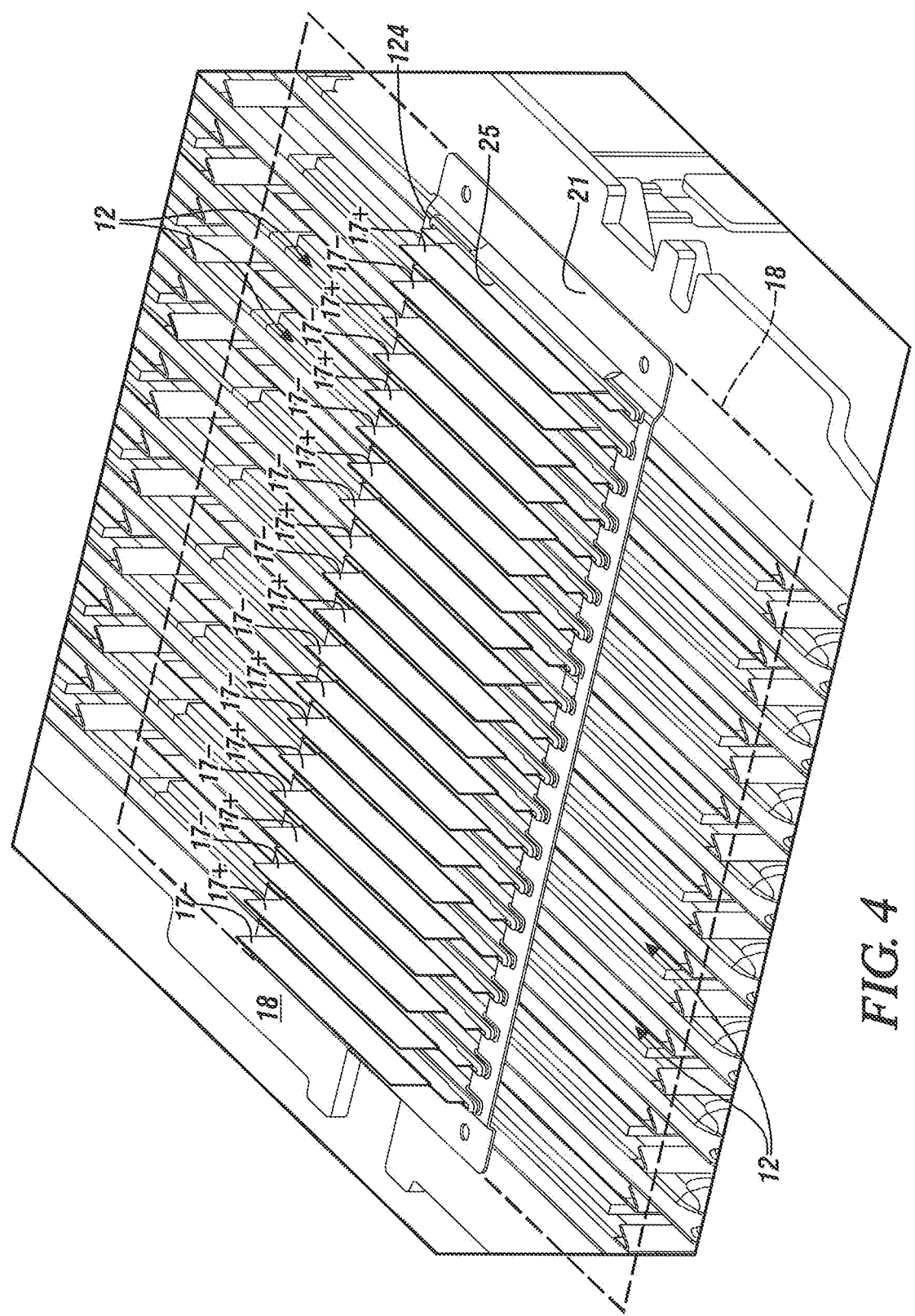
FIG. 4 is a schematic perspective view illustration of a portion of the cell stack of FIG. 1 depicting the isolative shield in an installed position with respect to an aligned row of exposed cell tabs.

With respect to the above-noted alignment of the cell tabs 17, the cell tabs 17 on a given outer surface 18 or 180 are arranged with alternating positive and negative polarities. The alternating polarity is best shown in FIG. 4, with adjacent cell tabs 17 of two adjacent battery cells 16 having opposite charges, such that a negative cell tab 17– (anode tab) of a given battery cell 16 is positioned immediately adjacent to a positive cell tab 17+ (cathode tab) of another battery cell 16. In other words, opposite polarity cell tabs 17 of adjacent battery cells 16 form adjacent cell tabs with respect to one another.

Although not visible from the perspective of FIG. 1, an identical set of cell tabs 17 extends from the outer surface 180. In the example orientation of FIG. 1, the outer surfaces 18 and 180 form upper and lower surfaces of the cell stacks 12, respectively. As will be described in detail below with reference to FIGS. 3A, 3B, and 5, with FIG. 3A in particular providing a view that is taken through cut line 3-3, the battery section 10 also includes a plurality of conductive interconnect members 50 arranged in parallel rows above the cell tabs 17 and collectively forming an electrical connection or local bus bar between adjacent exposed cell tabs 17.

Figure 2:
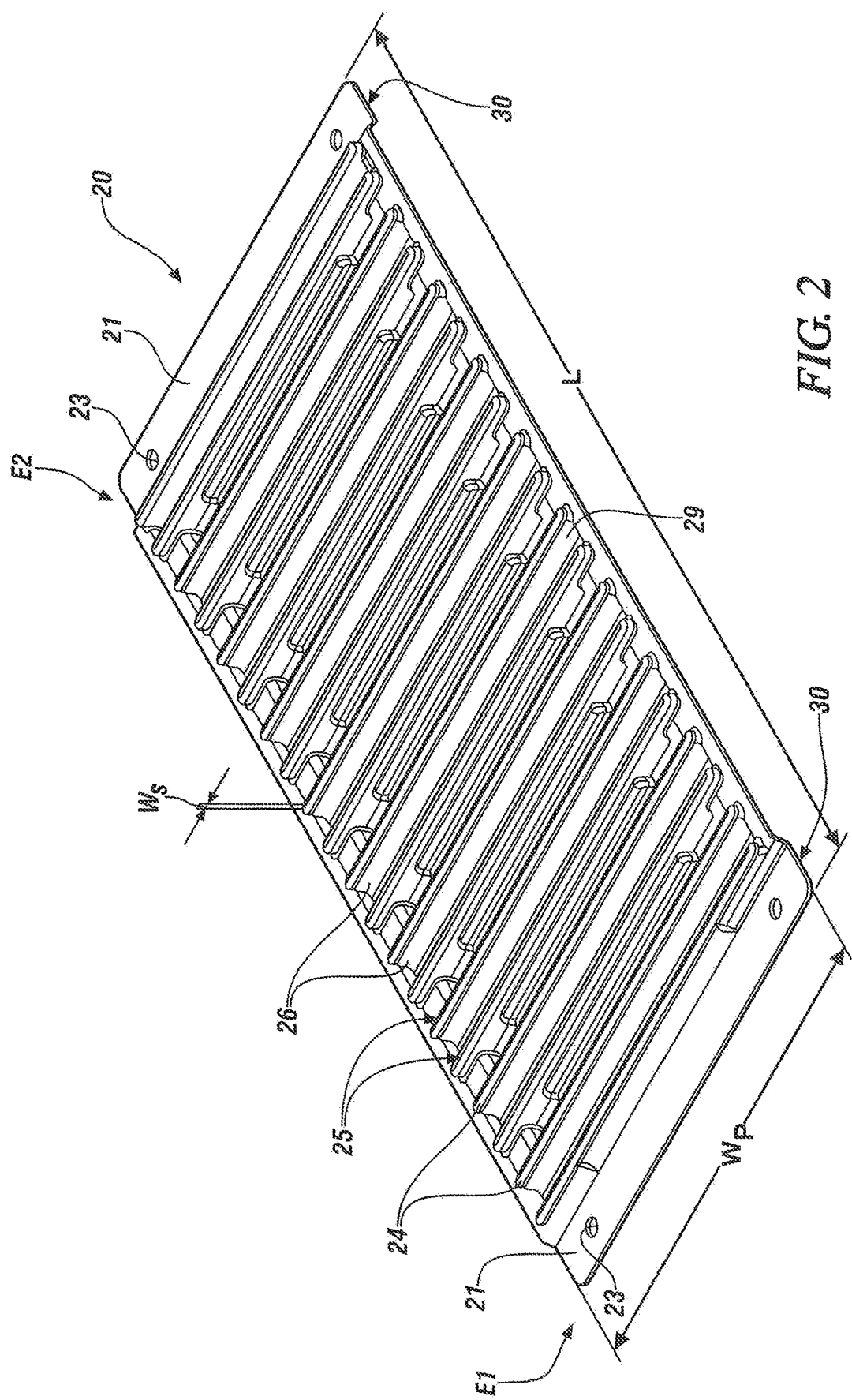
FIG. 2 is schematic perspective view illustration of an isolative shield usable as part of the battery section of FIG. 1.

For each cell stack 12 used in the battery section 10 of FIG. 1, an isolative shield 20 or 120, e.g., a rectangular isolative shield 20 as shown, is disposed adjacent to the outer surfaces 18 and 180, respectively, with the structure of the isolative shield 20 described in detail below with additional reference to FIGS. 2 and 4. The individual cell tabs 17 are arranged and assembled to protrude through the isolative shield 20. The cell tabs 17 are thereafter welded together and electrically connected to an interconnect board (ICB) 22 or 122 situated on or proximate the outer surfaces 18 or 180, respectively. Although omitted from the various figures for illustrative simplicity, a battery controller (not shown) may be used in conjunction with the battery section 10. Such a battery controller may be connected to the ICBs 22 and 122 and embodied as a multi-purpose electrical sensing board, e.g., via a multi-pin connector and/or a wireless connection used to measure individual cell voltages and/or currents, temperatures, and possibly other control parameters for each of the battery cells 16 of the various cell stacks 12.

A description is provided hereafter for the isolative shield 20 that is intended to also apply to the identically-configured isolative shield 120. Referring to FIG. 2, the isolative shield 20 may be constructed of a body 29, e.g., a generally corrugated body 29 as described below, with the body 29 terminating in a pair of flat end flanges 21 disposed at distal ends E1 and E2 of the body 29. The isolative shield 20 may be a thin, generally flat or planar piece of temperature-resistant material. For instance, the isolative shield 20 may be thermoformed, or may be constructed via compression or injection molding, using an application-suitable suitable thermoplastic material, having a length (L) and a width ($W_P$). The isolative shield 20 may have a thickness sufficient to withstand errant droplets of molten copper, aluminum, or other metals used in the construction of the cell tabs 17. Such weld spatter droplets are typically on the order of about 0.05-0.1 mm, and therefore a sufficient thickness may be less than about 1 mm in some embodiments, or less than about 0.5 mm in other embodiments, with "about" as used to describe this embodiment meaning to within ±10 percent.

The end flanges 21 are coextensive with the width ($W_P$) and may optionally define one or more holes 23. Fasteners (not shown) may be passed through the holes 23 to locate and/or securely fasten the isolative shield 20 to the outer surface 18 shown in FIGS. 1 and 4, with an underside 30 of the isolative shield 20 resting on the outer surface 18 and a portion of the side plates 13 (see FIG. 1) when the isolative shield 20 is in an installed position, such that the body 29 of the isolative shield 20 is perpendicular to the cell tabs 17 contained therein. Alternatively, adhesive material may be applied to the underside 30 and/or the outer surface 18 to adhesively bond the isolative shield 20 to the outer surface 18.

The isolative shield 20 may be generally corrugated in its construction, and therefore may include a plurality of ridges or transverse ribs 24, i.e., extending along the width ($W_P$) in an orthogonal direction with respect to the length (L) of the isolative shield 20. The transverse ribs 24 are parallel to each other and separated by a contoured surface 26, with the transverse ribs 24 defining a corresponding elongated through-slot 25 along an elongated apex 124 of the transverse ribs 24. The through-slots 25 may be coextensive with each of the transverse ribs 24 as shown. The countered surfaces 26, e.g., generally semi-circular or oval-shaped troughs as shown, may be configured to conform to a profile of the ICB 22 as best shown in FIG. 3A.

Figure 3A:
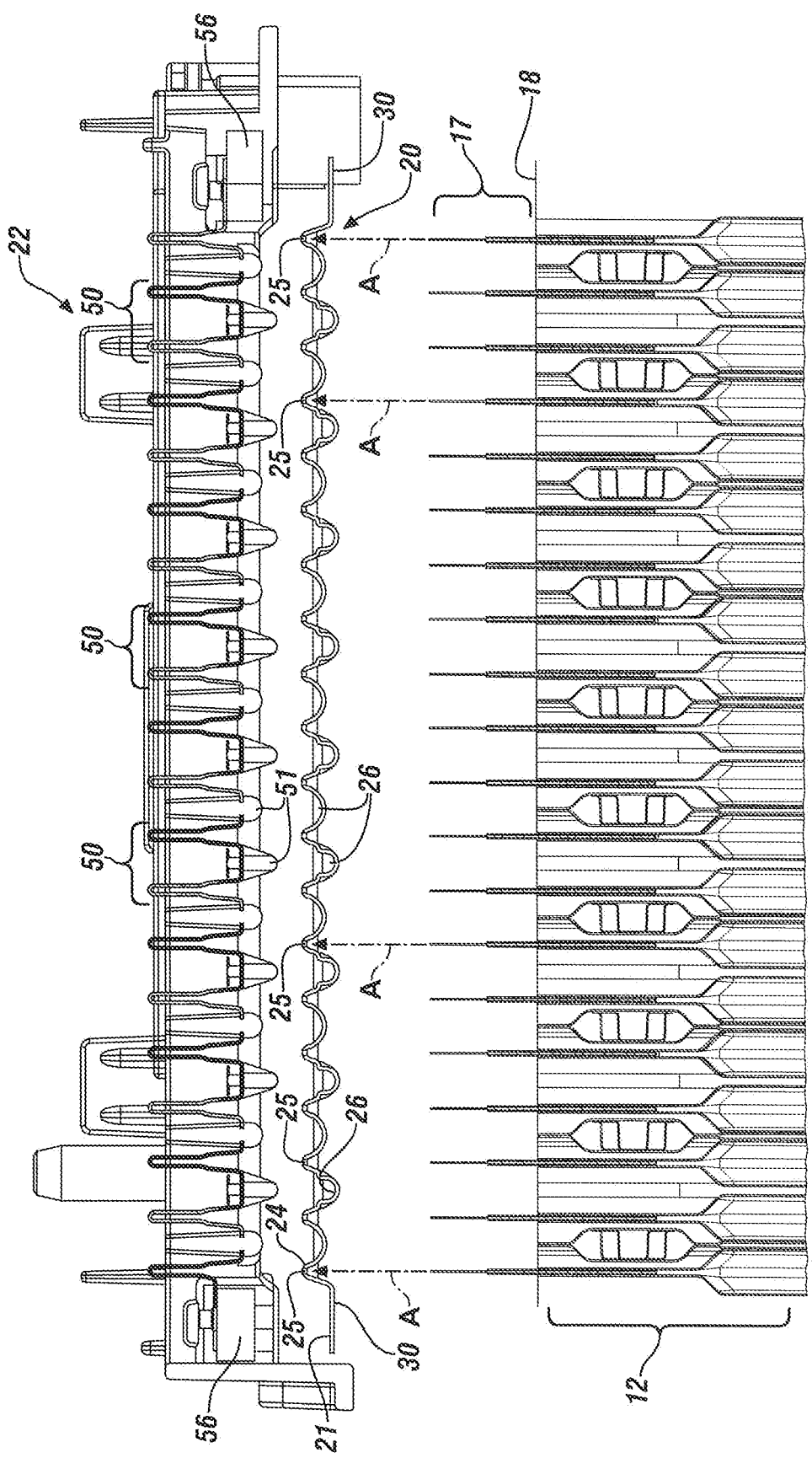
FIG. 3A is a schematic cross-sectional side view illustration of a portion of an example cell stack taken along cut line 3-3 of FIG. 1.

The through-slots 25 have a corresponding slot width ($W_S$) that is slightly smaller than a width of the cell tabs 17 of FIG. 1, such that a snug interference fit is provided along the elongated apex 124 (FIG. 3B) between the transverse ribs 24 and the cell tabs 17, as depicted in FIGS. 3A and 4, e.g., the slot width ($W_S$) of the through-slots 25 is sized such that the cell tabs 17 are able to slide into the through-slots 25 with some perimeter contact and resultant frictional force during insertion, and thus with a perimeter force applied by the transverse ribs 24 to the cell tabs 17 after such insertion. Example thicknesses of the cell tabs 17 are about 0.2 mm-0.4 mm in some embodiments, and therefore the slot width ($W_S$) is smaller than the thickness of the cell tabs 17 by an amount sufficient for providing the disclosed interference fit.

Referring to FIG. 3A, installation of the isolative shield 20 may be performed by aligning the cell tabs 17 of the individual battery cells 16 with a corresponding one of the through-slots 25 defined by the isolative shield 20, with alignment indicated by arrows A. Installation of the isolative shield 20 proceeds with insertion of the cell tabs 17 into a corresponding one of the through-slots 25 until the undersurface 30 of the isolative shield 20 contacts the outer surface 18. The end flanges 21 are then fastened or bonded to the outer surface 18 to achieve an installed position as best shown in FIG. 4. The contoured surfaces 26 of the isolative shield 20 may be shaped or contoured to mesh with a primary surface 51 of the ICB 22 in some embodiments. Subsequent welding of the interconnect members 50 to the cell tabs 17 may occur once the ICB 22 is in place, with a bus bar and weld cap assembly 56 shown at either end of the ICB 22.

Those of ordinary skill in the art will appreciate that a method of constructing the cell stack 12 of FIG. 1 is enabled via the present disclosure. Such a method may include providing the cell stack 12, i.e., having adjacent battery cells 16, and then inserting the positive and negative cell tabs 17+ and 17− of FIG. 4 into the through-slots 25 of the isolative shield 20. The method may also include positioning a primary surface of the isolative shield 20, e.g., undersurface 30, adjacent to the outer surfaces 18 of the adjacent battery cells 16 after inserting the positive and negative cell tabs 17+ and 17−. Surface 30 of the isolative shield 20 is then affixed to the cell stack 12.

The method may include welding or otherwise joining the conductive interconnect member 50 to the positive and negative cell tabs 17+ and 17− on a side of the isolative shield 20 that is opposite the surface 30, e.g., using a laser welding process. The method may also include connecting the ICB 22 to the battery cells 16 such that the isolative shield 20 is disposed between the ICB 22 and the outer surfaces 18 of the battery cells 16. Connecting the ICB 22 to the adjacent battery cells 16 may include placing a contoured surface of the ICB 22 in meshed engagement with a corrugated surface of the isolate shield 20 as noted above.

The preceding assembly steps may be completed before installing the ICB 22. Such a manufacturing sequence has the benefit of isolation and positioning of the cell tabs 17, which in turn helps to ensure that adjacent cell tabs 17 do not touch each other prior to initiating the welding process. The cell tabs 17 are also surrounded by the material of the isolative shield 20 and therefore properly aligned and structurally retained or supported. Alternatively, the isolative shield 20 may be connected to the ICB 22 before installing the ICB 22. Such an approach may facilitate manufacturing, particularly if the isolative shield 20 could be co-molded with or integrally formed with the ICB 22.

As shown in FIG. 4, once the isolative shield 20 is in the installed position, a row of positive cell tabs (17+) and negative cell tabs (17−) of adjacent battery cells 16 is aligned and structurally supported within the through-slots 25. That is, as noted above the through-slots 25 are configured to provide an interference fit with the cell tabs 17+ and 17− and thus orient the cell tabs 17+ and 17− orthogonally with respect to the outer surface 18. Thereafter, the interconnect members 50 may be installed onto the cell tabs 17, e.g., using a laser welding process.

Figure 3B:
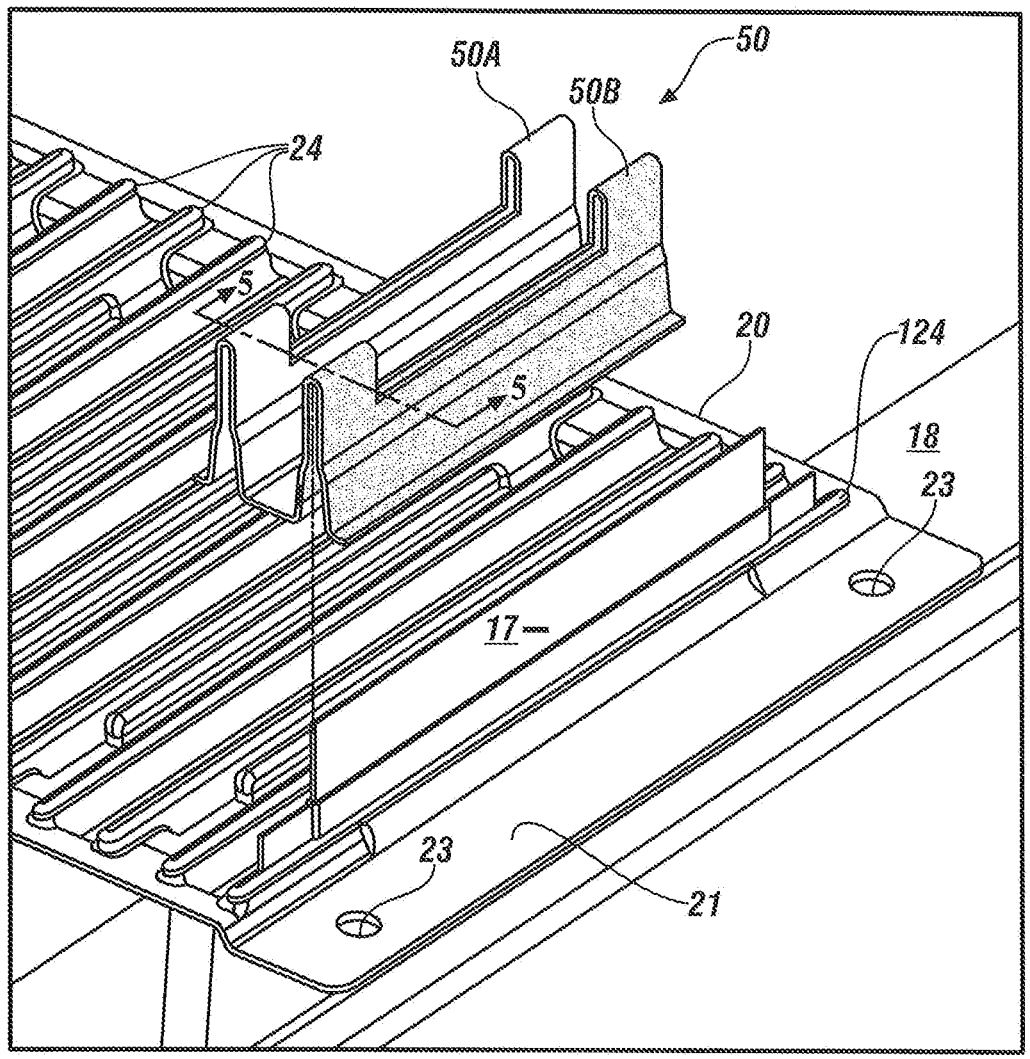
FIG. 3B is a schematic perspective view illustration of a conductive interconnect member usable as part of the cell stack of FIG. 1.

FIG. 3B depicts the relative positioning of the interconnect members 50 with respect to the cell tabs 17 according to a possible configuration, with an example negative cell tab 17− shown for simplicity. The cell tabs 17 shown in FIGS. 1, 3A, and 5 include positive cell tabs 17+, i.e., a cathode tab, that are optionally constructed of aluminum, and negative cell tabs 17−, i.e., anode tabs, which are optionally constructed of copper. While copper and aluminum are example materials usable within the scope of the disclosure, other conductive materials may be used and/or a single material may be used to form conductive joints within the battery section 10.

In a possible embodiment, the interconnect member 50 may be embodied as an elongated member constructed of parallel U-shaped wall portions 50A and 50B, with the U-shaped wall portions 50A and 50B joined together or integrally formed to thereby construct the interconnect member 50. The U-shaped wall portions 50A may be constructed from the same materials as the positive electrodes 17+. Likewise, the U-shaped wall portions 50B may be constructed as the same material as the negative electrodes 17−.

Figure 5:
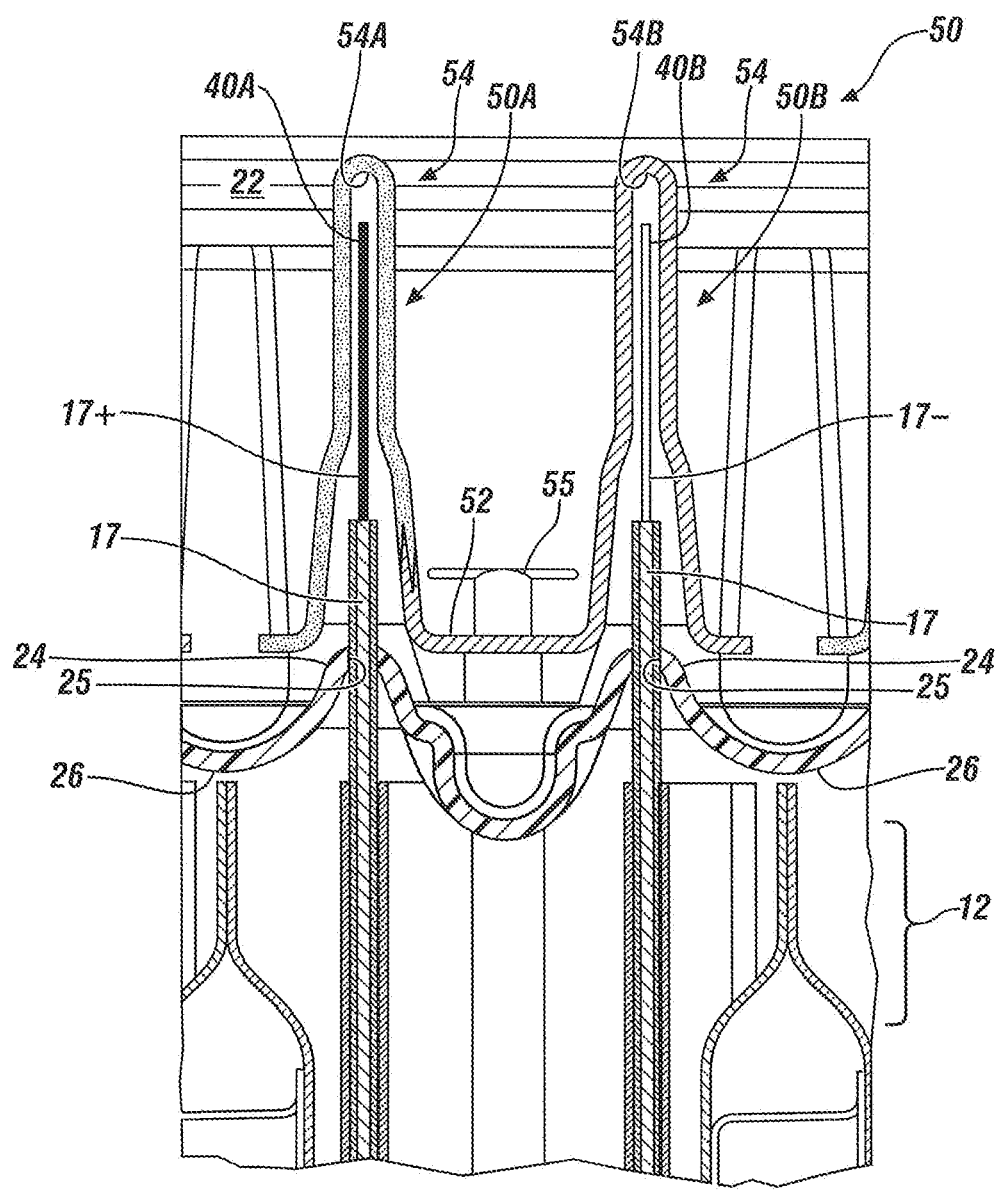
FIG. 5 is a schematic cross-sectional side view illustration of a portion of the isolative shield, interconnect member, and ICB taken along cut line 5-5 of FIG. 3B.

As shown in FIG. 5, which is a view taken through cut line 5-5 of FIG. 3B, the U-shaped wall portions 50A and 50B of the interconnect member 50 may be separated by a floor 52, with the floor 52 and the adjoining U-shaped wall portions 50A and 50B together forming a generally U-shaped cross-section as shown. The U-shaped wall portions 50A and 50B may each wrap around distal edges 40A and 40B of the respective positive and negative cell tabs 17+ and 17− and extend toward the outer surface 18, thereby forming narrow U-shaped channels 54A and 54B within which the respective positive and negative cell tabs 17+ and 17− are disposed. Other conductive interconnect members 50 may be contemplated within the scope of the disclosure, and therefore the particular configuration of FIGS. 3A and 5 is exemplary and non-limiting.

The isolative shield 20 described above with reference to FIGS. 1-5 is intended to facilitate formation of the individual cell stacks 12 of FIG. 1, and ultimately, the battery section 10, using a laser-welding process or other process in which errant weld spatter is present as a product of the welding process. The isolative shield 20 helps ensure electrical isolation of the exposed positive and negative cells tabs 17 of FIG. 3A prior to performing the welding process, while also forming a temperature-resistant physical barrier to weld spatter. These and other attendant benefits may be realized by one of ordinary skill in the art in view of the disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A cell stack comprising:
    a first battery cell and a second battery cell arranged adjacent to each other to form adjacent battery cells, each of the adjacent battery cells respectively having a positive cell tab, a negative cell tab, and an outer surface, wherein the outer surface of the first battery cell is flush with the outer surface of the second battery cell, the positive cell tab of the first battery cell protrudes orthogonally from the outer surface of the first battery cell, and the negative cell tab of the second battery cell protrudes orthogonally from the outer surface of the second battery cell; and
    an isolative shield having a corrugated body arranged in a perpendicular direction with respect to the positive and negative cell tabs, the corrugated body being spaced apart from distal edges of the positive cell tab and the negative cell tab, and positioned adjacent to the outer surfaces of the adjacent first and second battery cells, the corrugated body of the isolative shield having transverse ribs each defining a respective through-slot along an elongated apex of the transverse ribs, the respective through-slot receiving therein a respective one of the positive and negative cell tabs;
    wherein the through-slot has a corresponding width configured to form an interference fit with a respective one of the positive and negative cell tabs along the elongated apex, and wherein the isolative shield is configured to align and structurally support the positive and negative cell tabs prior to a welding process, and form a physical barrier to ingress of weld spatter into the first and second battery cells during the welding process.

2. The cell stack of claim 1, further comprising a conductive interconnect member that wraps around the distal edges, and is conductively welded to the positive and negative cell tabs of the adjacent battery cells.

3. The cell stack of claim 1, further comprising an interconnect board (ICB), wherein the isolative shield is positioned between the ICB and the outer surfaces of the adjacent battery cells, and wherein the positive and negative cell tabs are electrically connected to the ICB.

4. The cell stack of claim 3, wherein a primary surface of the ICB is contoured to mesh with a primary surface of the isolative shield.

5. The cell stack of claim 1, wherein the isolative shield is constructed of thermoformed, injection molded, or compression molded plastic.

6. The cell stack of claim 5, wherein the isolative shield has a thickness of less than 1 mm.

7. The cell stack of claim 1, wherein the isolative shield includes a pair of flat end flanges having an undersurface that rests on the outer surfaces of the adjacent first and second battery cells.

8. A method of constructing a cell stack, the method comprising:
    providing a cell stack having a first battery cell located adjacent to a second battery cell to form adjacent battery cells, each of the adjacent battery cells having a respective positive cell tab, a negative cell tab, and an outer surface, with the outer surface of the first battery cell being flush with the outer surface of the second battery cell, wherein the positive cell tab of the first battery cell protrudes from the outer surface of the first battery cell and the negative cell tab of the second battery cell protrudes from the outer surface of the second battery cell;
    providing an isolative shield having a corrugated body with transverse ribs each defining a respective through-slot along an elongated apex of the transverse ribs, each through-slot being configured to receive therein a respective one of the positive and negative cell tabs, the corrugated body being spaced apart from distal edges of the positive cell tab and the negative cell tab, wherein the through-slot has a slot width configured to form an interference fit with a respective one of the positive and negative cell tabs along the elongated apex;
    inserting the positive and negative cell tabs into the respective through-slots of an isolative shield such that the interference fit is provided along the elongated apex, thereby aligning and structurally supporting the positive and negative cell tabs prior to a welding process, and forming a physical barrier to ingress of weld spatter into the first battery cell and the second battery cells during a welding process;
    positioning a primary surface of the isolative shield adjacent to the outer surfaces of the adjacent first and second battery cells after inserting the positive and negative cell tabs; and
    affixing the primary surface of the isolative shield to the cell stack.

9. The method of claim 8, wherein the primary surface is located on a first side of the isolative shield, the method further comprising wrapping a conductive interconnect member around the distal edges, and then joining, via the welding process, the conductive interconnect member to the positive and negative cell tabs on a second side of the isolative shield that is opposite the first side.

10. The method of claim 9, wherein joining the conductive interconnect member includes welding the conductive interconnect member to the positive and negative cell tabs via a laser welding process.

11. The method of claim 8, further comprising connecting an interconnect board (ICB) to the adjacent battery cells such that the isolative shield is disposed between the ICB and the outer surfaces of the first battery cell and the second battery cell.

12. The method of claim 11, wherein connecting the ICB to the adjacent battery cells includes placing a contoured surface of the ICB in meshed engagement with a corrugated surface of the corrugated body of the isolative shield.

* * * * *